(12) United States Patent
Anno

(10) Patent No.: US 8,773,697 B2
(45) Date of Patent: Jul. 8, 2014

(54) IMAGE FORMING APPARATUS, METHOD OF CONTROLLING IMAGE FORMING APPARATUS, AND STORAGE MEDIUM

(75) Inventor: Makoto Anno, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 125 days.

(21) Appl. No.: 13/356,370

(22) Filed: Jan. 23, 2012

(65) Prior Publication Data

US 2012/0194860 A1 Aug. 2, 2012

(30) Foreign Application Priority Data

Jan. 27, 2011 (JP) ................................ 2011-015400

(51) Int. Cl.
*G06K 15/00* (2006.01)
*G06F 3/12* (2006.01)
*H04N 1/00* (2006.01)
*H04N 1/60* (2006.01)
*H04N 1/387* (2006.01)

(52) U.S. Cl.
USPC ............ 358/1.15; 358/1.14; 358/1.6; 358/1.9; 358/453

(58) Field of Classification Search
USPC ........ 358/1.15, 1.13, 1.2, 1.18, 1.14, 1.6, 1.9, 358/453, 501, 426.06, 537, 538, 540, 528; 715/246, 200, 243, 252, 274, 724, 804; 355/25, 82, 404

See application file for complete search history.

(56) References Cited

U.S. PATENT DOCUMENTS

2009/0195816 A1* 8/2009 Hosoda ........................ 358/1.15

FOREIGN PATENT DOCUMENTS

JP 7-299936 A 11/1995

OTHER PUBLICATIONS

Yasuyuki, Page Printer Nov. 14, 1995, Machine Translation Japanese Patent Publication, JP07299936, all pages.*

* cited by examiner

*Primary Examiner* — Ngon Nguyen
(74) *Attorney, Agent, or Firm* — Canon U.S.A., Inc. IP Division

(57) ABSTRACT

A printer for processing a variable data printing (VDP) job includes a control unit. The control unit causes a printer unit to perform test printing of a part of a plurality of records included in a VDP job determined as a test print job. After the part of the record is printed, the control unit accepts a print instruction for records which are not printed. In response to the accepted print instruction, the control unit causes the printer unit to print the records that are not printed by the test printing.

9 Claims, 6 Drawing Sheets

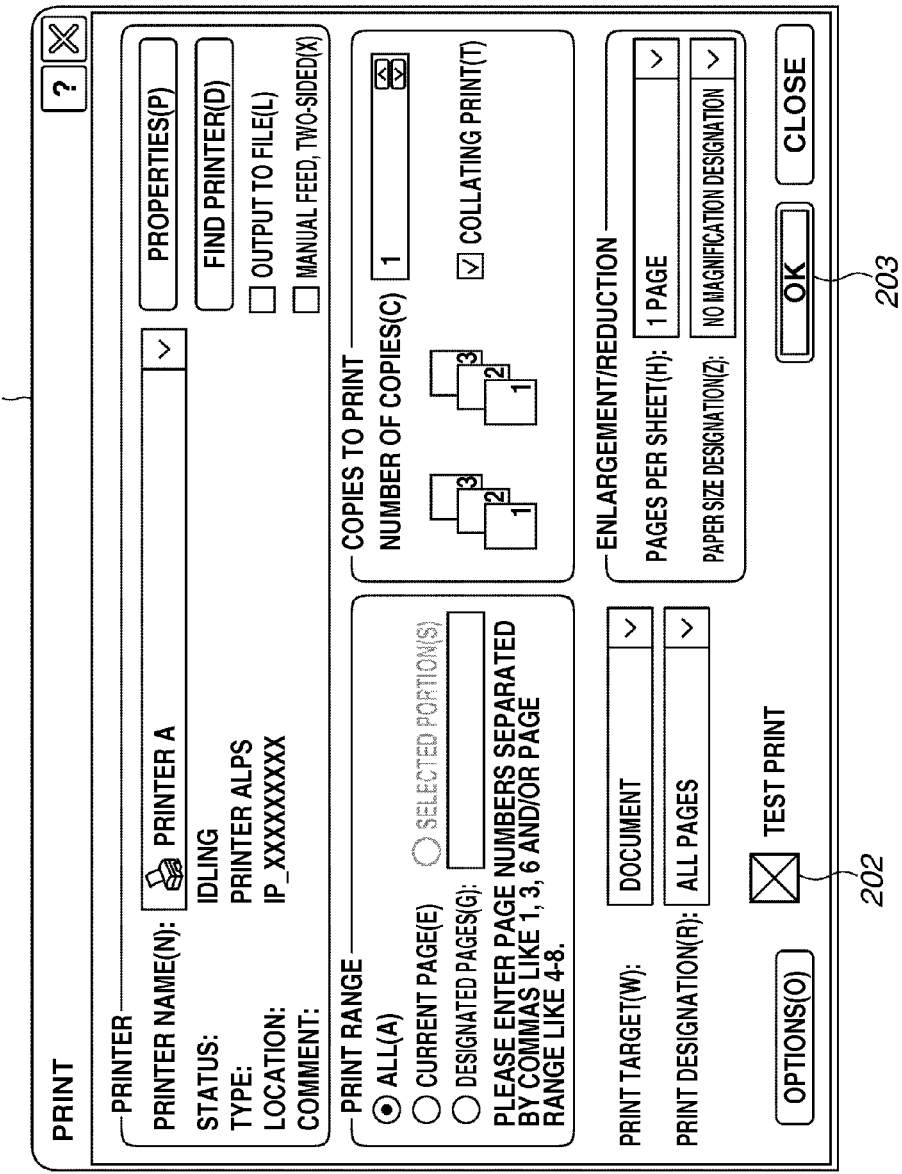

IMAGE FORMING APPARATUS, METHOD OF CONTROLLING IMAGE FORMING APPARATUS, AND STORAGE MEDIUM

BACKGROUND OF THE INVENTION

1. Field of the Invention

The present invention relates to an image forming apparatus which can perform test printing to output only apart of image data included in a print job and subsequently print the rest of the image data, a method for controlling the image forming apparatus, and a program.

2. Description of the Related Art

Conventionally, copying apparatuses have a function referred to as test copy. Test copy includes initially outputting only a part of a copy job that includes a plurality of number of copies, and visually checking the output to see whether job settings such as a staple position and image processing settings are as intended. If the job settings are proper, the rest of the copies are output subsequently. Image forming apparatuses including printers and multifunction peripherals have a function referred to as test printing, which includes executing only a part of a print job and executing the rest later.

Japanese Patent Application Laid-Open No. 7-299936 discusses a technique for performing test printing on a sheet different from one specified by a job.

Recent image forming apparatuses have improved in processing speed, and become capable of mass page printing such as variable data printing (VDP) and transaction printing. For example, a VDP job produces outputs customized to respective customers to whom the output prints are delivered. A single VDP job includes a large number of pages, and typically, the number of copies of the job is one.

Test printing that can be carried out by the conventional technology includes initially printing a part of a plurality of copies, checking the output, and subsequently printing the rest. In other words, the conventional technology implements test printing when printing a plurality of copies. It is therefore difficult to perform test printing on a VDP job, which is typically a single-copy output.

SUMMARY OF THE INVENTION

One of the aspects of the present invention is directed to an image forming apparatus which can effectively perform test printing of a VDP job including a plurality of records.

According to an aspect of the present invention, an image forming apparatus for processing a variable data printing (VDP) job including a plurality of records includes a determination unit configured to determine whether a VDP job received from an information processing apparatus is a test print job of which test printing is instructed, a test print unit configured to perform test printing of apart of a plurality of records included in the VDP job that is determined as the test print job, an accepting unit configured to accept a print instruction for a record that is included in the VDP job and is not printed by the test printing after the part of the plurality of records is printed, and a print unit configured to print the record that is included in the VDP job and is not printed by the test printing in response to the print instruction, wherein a target record to be printed by the test print unit and a target record to be printed by the print unit are different from each other, so that a print product printed by the test print unit includes a print content different from that of a print product printed by the print unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 2 illustrates an example of a setting screen of a printer driver.

DESCRIPTION OF THE EMBODIMENTS

Various exemplary embodiments, features, and aspects of the invention will be described in detail below with reference to the drawings.

Figure 1:
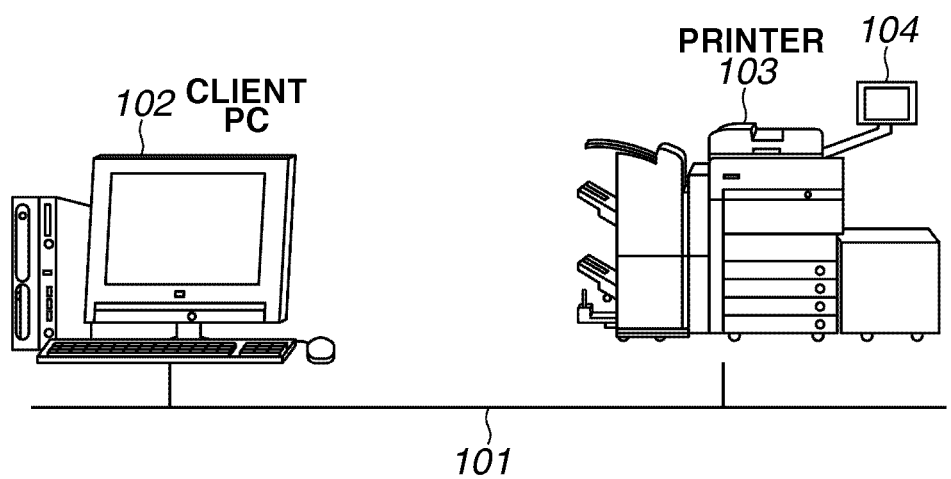
FIG. 1 illustrates a system configuration which is applied to a first exemplary embodiment of the present invention.

FIG. 1 illustrates an example of minimum configuration of apparatuses applied to a first exemplary embodiment. A client personal computer (PC) 102 and a printer 103 are connected by a network 101. The client PC 102 is an information processing apparatus applied to an exemplary embodiment of the present invention. The client PC 102 transmits a print job to the printer 103 by a printer driver, which is software having a print job input function.

The printer 103 is an image forming apparatus applied to an exemplary embodiment of the present invention. The printer 103 processes the print job transmitted from the client PC 102 and prints image data based on the print job onto recording media for output. When processing the print job, the printer 103 displays a processing status of the print job on an operation unit 104 of the printer 103 so that the user can check the processing status. The printer 103 accepts instructions such as cancellation of the print job and reprinting and performs relevant processing according to user operations made via the operation unit 104.

FIG. 2 illustrates an example of a setting screen of the printer driver in the client PC 102. Suppose, for example, that application software (referred to as an application) running on an operating system (OS) of the client PC 102 creates and prints a document. When the user selects a print command from a menu of the application, a setting screen 201 appears on a display (not illustrated) of the client PC 102.

The setting screen 201 includes a check box 202 for instructing the printer 103 to perform test printing of a print job. When the user presses an OK button 203 with the check box 202 checked, a print job including a test print instruction is transmitted from the client PC 102 to the printer 103.

Figure 3A:
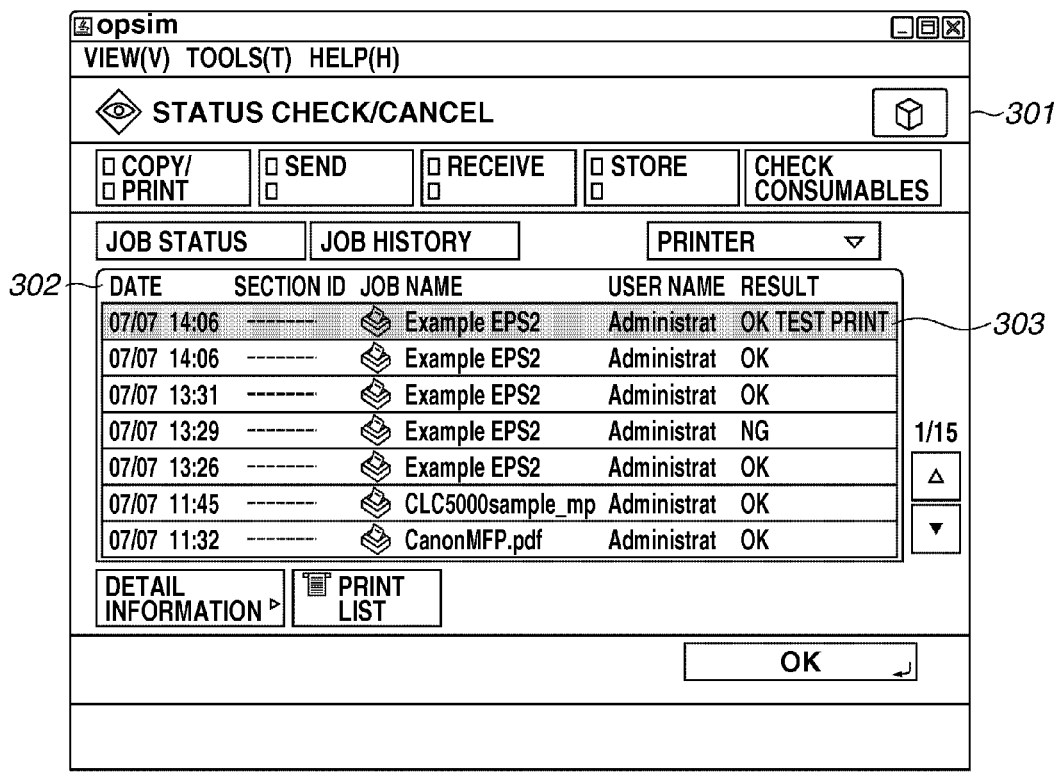
FIGS. 3A and 3B illustrate an example of an operation screen of a printer.

FIG. 3A illustrates an example of a job status confirmation screen which is displayed on the operation unit 104 of the printer 103. When the user presses a button on the operation unit 104 for checking the statuses of jobs in the printer 103, a confirmation screen 301 appears.

The confirmation screen 301 can be switched between a job status screen and a job history screen. The job status screen displays a list for checking the statuses of jobs on standby. The job history screen displays a list for checking the processing results of jobs that have already been processed.

After test printing is performed to print a part (a record) of a print job, the print job is displayed in the list on the job history screen. The print job of which test printing is instructed and a part (a record) of which is printed (test print job) and normal jobs are identifiably displayed.

In the confirmation screen in FIG. 3A, a list 302 of a job history screen is displayed. The list 302 includes a test print job 303. The test print job 303 is labeled "test print" in a "result" field. Based on the information indicating that a job labeled "test print" is a test print job, the user can identify that the job is a print job a part (a record) of which is printed by test printing. In the example illustrated in FIG. 3A displays the information as to whether a job is a test print job by displaying the character string "test print." However, the information may be displayed by using an icon or color.

Figure 3B:
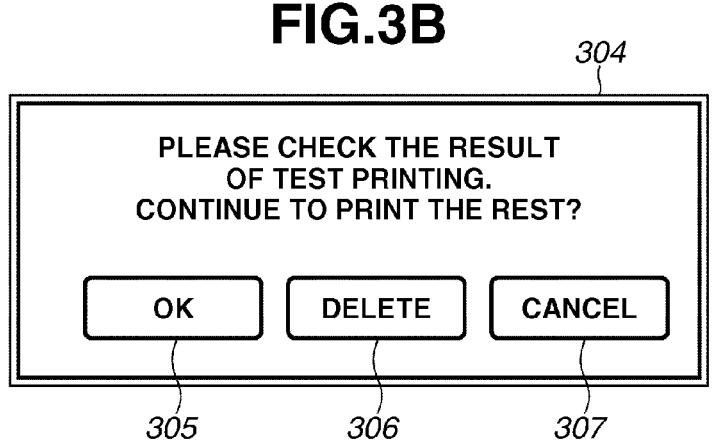

FIG. 3B illustrates an instruction screen for accepting an instruction whether to print the rest of image data of the test print job. The instruction screen 304 appears when the test print job 303 is selected in the list 302 of the job history screen. The instruction screen 304 includes an OK button 305, a delete button 306, and a cancel button 307.

When the OK button 305 is pressed, the printer 103 accepts a print instruction for the rest of the image data of the test print job and prints the rest of the print job. When the delete button 306 is pressed, the printer 103 deletes the test print job stored therein. When the cancel button 307 is pressed, the printer 103 simply returns to the confirmation screen 301 without doing any processing.

Figure 4:
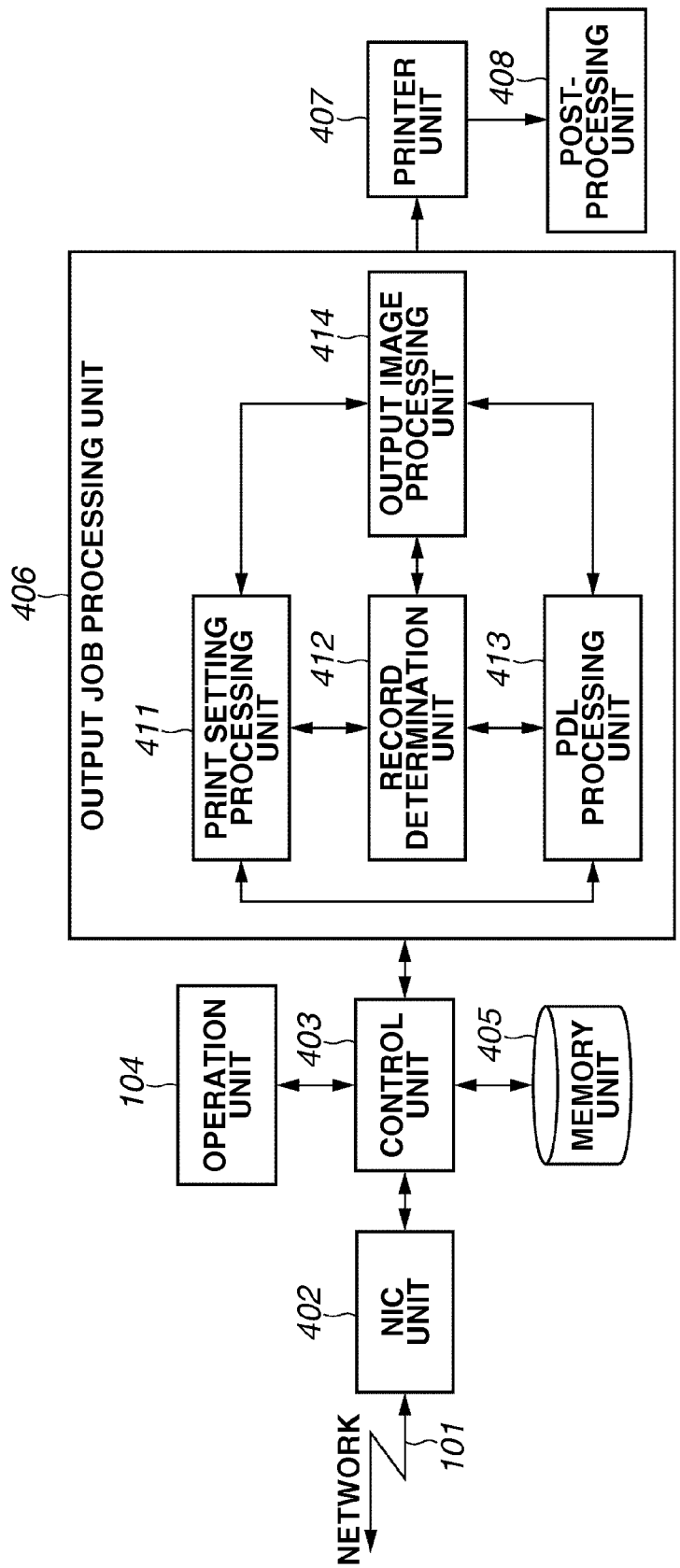
FIG. 4 is a block diagram illustrating a configuration of internal functions of the printer.

FIG. 4 is a block diagram of functional units in the printer 103. The operations of the printer 103 will be described below with reference to FIG. 4.

A network interface card (NIC) unit 402 receives a print job input from the client PC 102 via the network 101. A control unit 403, which controls the entire printer 103, temporarily stores the print job into a memory unit 405. The control unit 403 includes a central processing unit (CPU) (not illustrated). A read-only memory (ROM) or a hard disk (HD) of the printer 103 stores a control program. The control unit 403 reads the control program into a random access memory (RAM) and executes the control program to control the entire printer 103. For example, the control unit 403 performs display control on the operation unit 104 serving as a display unit.

A print job read from the memory unit 405 is processed in an output job processing unit 406. More specifically, the output job processing unit 406 generates image data to be drawn on printing paper, and generates print setting information about various types of print settings including paper handling (two-sided printing or one-sided printing), stapling, N-up printing, etc.

The output job processing unit 406 notifies a printer unit 407 and a post-processing unit 408 in the subsequent stages of the generated image data and print setting information. The printer unit 407 performs drawing and the post-processing unit 408 performs finishing processing to generate a final output product based on the print job.

The output job processing unit 406 includes a print setting processing unit 411, a record determination unit 412, a page description language (PDL) processing unit 413, and an output image processing unit 414.

The print setting processing unit 411 processes print settings included in a print job. The PDL processing unit 413 processes PDL data included in the print job. If the print job is a VDP job including a plurality of records, the record determination unit 412 determines a record of the VDP data. The output image processing unit 414 generates image data and print setting information from data processed by the above-described functional units, i.e., the print setting processing unit 411, the PDL processing unit 413, and the record determination unit 412.

The record of a VDP job will now be described. As described above, a VDP job is a print job whose output contents are customized to each individual customer to whom the print product is delivered, so that print products of different contents are provided for respective customers. The customization, however, does not cover output contents that are totally different from one customer to another.

Suppose, for example, that a clothing store is holding a sale and announces the sale information to customers by direct mails. Customer names and addresses vary from one another. The date, time, and place of the sale are the same. In such a case, the VDP job includes portions that vary from one customer to another (which will be referred to as variable data) and portions that are fixed (which will be referred to as reusable data). If the direct mails are printed on postal cards, the customer names and addresses are to be printed on the front side of the output products, and the date, time, and place of the sale on the back side.

For example, suppose a VDP job includes the name and address of Mr. A on the first page, the date, time, and place on the second page, the name and address of Ms. B on the third page, the date, time, and place on the fourth page, the name and address of Mr. C on the fifth page, and so on. A VDP job is such a job with a series of pieces of data on respective customers. A portion of a job for each individual customer in a VDP job will be referred to as a record, which is a unit of division of a job. In the case of the above-described direct mails, two of a plurality of pages included in the job correspond to a record.

VDP jobs include various data formats. Data formats unique to printer manufacturers have conventionally been used. Such data formats correspond to data for each individual customer and includes one or more pages of template data pieces including reusable data and variable data to be combined with the template data. When such a job is printed, a printer combines variable data into a predetermined position of the template data and prints the resultant. By detecting the number of pages of the template data pieces, the number of pages per record can be determined.

Among recent data formats is personalized print markup language (PPML). A PPML job includes reusable data and variable data, and the job configuration is described in an extensible markup language (XML) format. A PPML job is hierarchically structured by PPML, JOB (or DOCUMENT_SET), DOCUMENT, and PAGE. Such tags can be used for record determination. For example, <JOB> to </JOB> is determined to be a record. The above-described record is a specific example of record determination by the record determination unit 412. However, the method of record determination is not limited thereto. The record determination unit 412 may determine records by other methods suited to the format of the VDP job.

Figure 5:
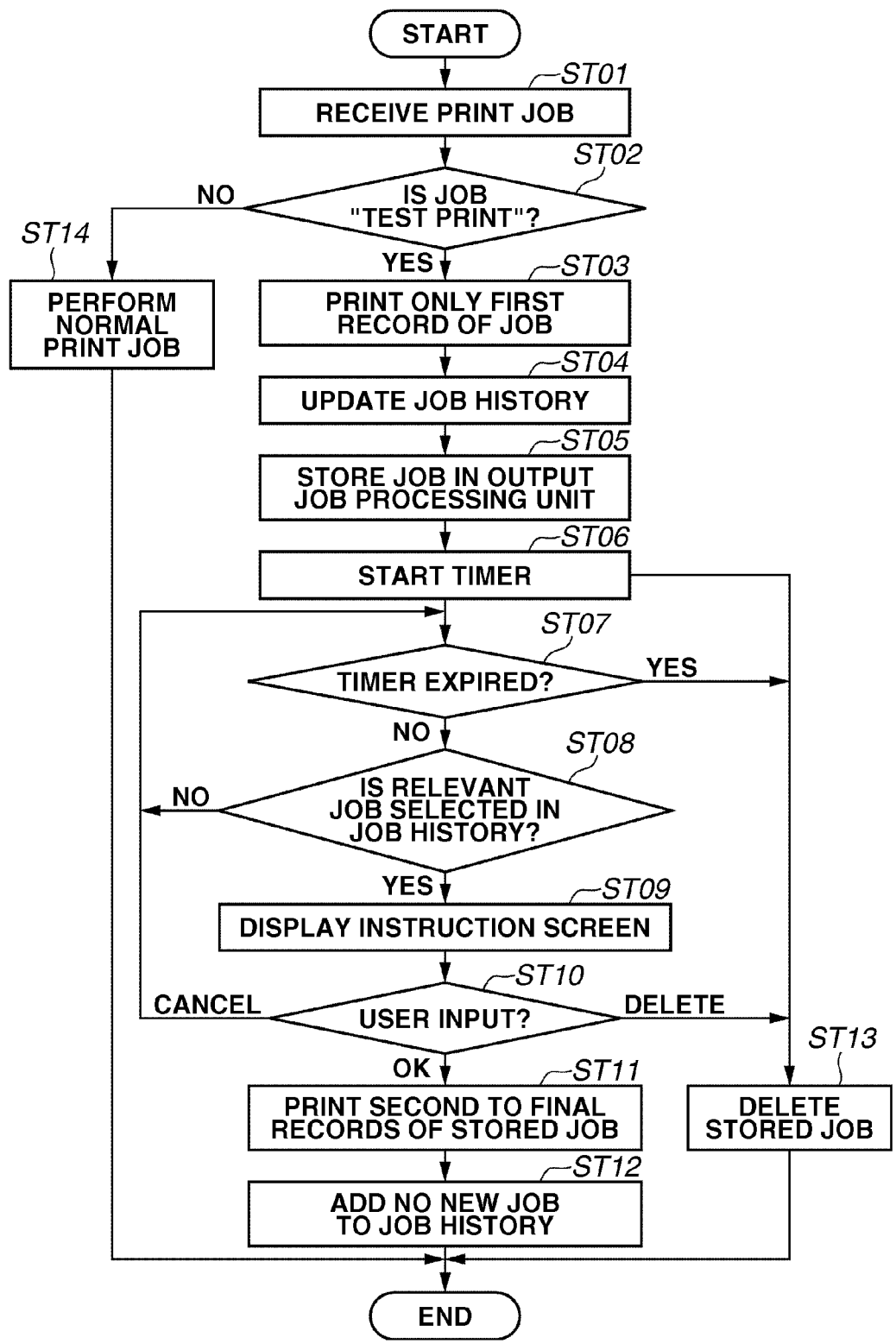
FIG. 5 is a flowchart illustrating a procedure of job processing according to the first exemplary embodiment of the present invention.

FIG. 5 illustrates a procedure by which the printer 103 processes a test print job of a VDP job. In the flowchart, steps are denoted by "ST". "ST01" represents step 01. The individual processes in the procedure in FIG. 5 are implemented by the CPU included in the control unit 403 executing the control program.

In step ST01, the control unit 403 receives a print job from the client PC 102 via the NIC unit 402.

In step ST02, the print setting processing unit 411 determines whether the received print job is a test print job. If the print job includes a test print instruction (YES in step ST02), the print setting processing unit 411 determines that the received print job is a test print job. If the print job does not include a test print instruction (NO in step ST02), the print setting processing unit 411 determines that the received print job is not a test print job.

If the received print job is determined to be the test print job (YES in step ST02), the print setting processing unit 411 advances the processing to step ST03. If the received print job is determined not to be the test print job (NO in step ST02), the print setting processing unit 411 advances the processing to step ST14. In step ST14, the printer 103 performs the print job as a normal print job. The printer 103 then ends the processing.

In step ST03, the printer unit 407 and the post-processing unit 408 perform output processing according to a record of image data and print setting information which are generated by the output job processing unit 406. As a result, only one record among a plurality of records included in the test print job (VDP job) is output.

The processing in step ST03 will now be described in more detail. The record determination unit 412 determines a range to be included in the first record of the test print job. The output image processing unit 414 then generates image data and print setting information of pages to be included in the determined range according to the result of processing of the print setting processing unit 411 and the PDL processing unit 413.

In step ST04, the control unit 403 stores history information of the print job of which one record has been processed into the memory unit 405. The memory unit 405 stores a job history table for managing a job history. The control unit 403 adds the history information of the print job to the job history table. The history information stored here includes an attribute indicating that the job is the test print job (test print attribute).

The job history is thus updated in step ST04. If the user instructs, via the operation unit 104, to display the job history, the job history of the test print job currently performed will be displayed. Since the history information of the test print job includes the test print attribute, the operation unit 104 displays information indicating that the job is the test print job as illustrated in a field 303 in FIG. 3A.

In step ST05, the control unit 403 stores the currently-processed test print job in the output job processing unit 406. In this step, the control unit 403 does not terminate the job as a normal job, but stores the job in the output job processing unit 406 and waits for resume instructions.

In this storage state, the output job processing unit 406 processes the second and subsequent records. Meanwhile, output to the printer unit 407 at the subsequent stage is suspended. Since the second and subsequent records continue to be processed, the test print job is retained in the output job processing unit 406 in a state in which image data capable of immediate printing by the printer unit 407 is generated. When an instruction to print the rest of the job, which is described below, is issued, the printer unit 407 can thus perform printing more quickly than in the normal processing.

In step ST06, the control unit 403 starts a timer.

In step ST07, the control unit 403 determines whether the timer has operated for a predetermined period and expired. If the timer is determined to be expired (YES in step ST07), the control unit 403 advances the processing to step ST13. In step ST13, the control unit 403 deletes the test print job stored in the output job processing unit 406.

If the test print job is stored for the predetermined period or longer, the stored job and its image data are deleted without waiting for the printing of the rest of the records. This processing can prevent the test print job from being stored for a long period, placing a burden on the memory of the printer 103.

On the other hand, if the timer is determined not to have expired (NO in step ST07), the control unit 403 advances the processing to step ST08.

In step ST08, the control unit 403 determines whether the test print job stored in the output job processing unit 406 is selected in the job history by the user via the operation unit 104. If the test print job is determined to be selected (YES in step ST08), the control unit 403 advances the processing to step ST09. If the test print job is determined not to be selected (NO in step ST08), the control unit 403 returns the processing to step ST07.

In step ST09, the control unit 403 causes the operation unit 104 to display the instruction screen 304 for accepting an instruction whether to print the rest of the image data on the test print job stored in the output job processing unit 406.

In step ST10, the control unit 403 determines the content of the instruction accepted according to a user operation via the instruction screen 304. If the control unit 403 determines that the OK button 305 is pressed on the instruction screen 304 and an instruction to print the rest of the image data on the test print job is accepted (OK in step ST10), the control unit 403 advances the processing to step ST11.

If the control unit 403 determines that the delete button 306 is pressed on the instruction screen 304 to instruct to delete the test print job (DELETE in step ST10), the control unit 403 advances the processing to step ST13.

If the control unit 403 determines that the cancel button 307 is pressed on the instruction screen 304 to make a cancel instruction (CANCEL in step ST10), the control unit 403 returns the processing to step ST07.

In step ST11, the printer unit 407 and the post-processing unit 408 perform output processing on the image data of the second and subsequent records of the job that is stored in the output job processing unit 406, excluding the first record which has already been printed by the test printing. While storing the job, the output job processing unit 406 has been processing the second and subsequent records and suspends output to the printer unit 407 at the subsequent stage. When the processing proceeds to step ST11, the output job processing unit 406 resumes the suspended output of the image data and the print setting information resulting from the job processing continued inside thereof to the printer unit 407 and the post-processing unit 408. The output job processing unit 406 thus causes the printer unit 407 and the post-processing unit 408 to perform output processing.

In step ST12, the control unit 403 deletes the test print attribute from the history information stored in step ST04 without adding the job that has been output in step ST11 to the job history. The printer 103 then ends the processing.

One record of a VDP job can be printed as a test print by executing the processing of the above-described flowchart illustrated in FIG. 5. Thus, the user can check the output product of the one record before instructing the printer to print the second and subsequent records.

In the present exemplary embodiment, the image data on the remaining second and subsequent records is printed in step ST11. However, all the records of the VDP job including the first record may be printed in step ST11. In such a case, the instruction screen 304 displayed in step ST09 may be configured so that the user can select whether to print the entire job or to print only the remaining part. The contents of the job to be stored in the output job processing unit 406 may be changed according to the selection on the instruction screen 304.

The first exemplary embodiment described an example where the first record of the VDP job is subjected to test printing and the remaining records are printed as the same single job. A second exemplary embodiment describes an example where a job, of which test printing is instructed from the client PC 102, is copied and the two jobs are used for test printing of the first record and printing of the remaining records. The apparatus configuration of the second exemplary embodiment is the same as the first exemplary embodiment. Thus, a description of the apparatus configuration will be omitted, and only differences from the first exemplary embodiment will be described.

Figure 6:
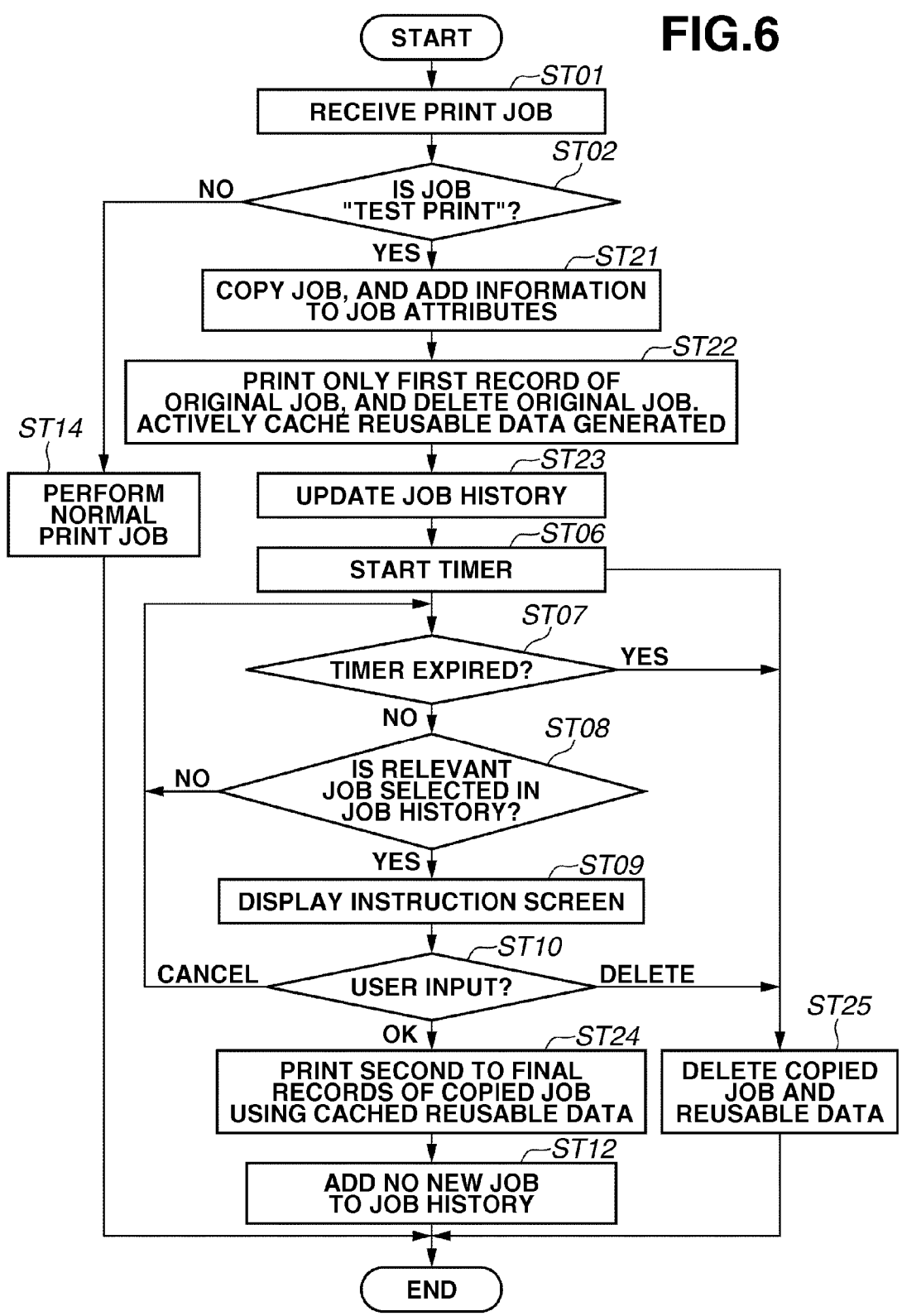
FIG. 6 is a flowchart illustrating a procedure of job processing according a second exemplary embodiment of the present invention.

FIG. 6 is a flowchart illustrating a procedure by which the printer 103 according to the present exemplary embodiment processes a test print job. The individual processes in the procedure in FIG. 6 are implemented by the CPU included in the control unit 403 executing a control program. In the procedure in FIG. 6, steps where processing similar to that of the procedure in FIG. 5 is performed will be designated by the same reference numerals. Description thereof will be omitted.

In step ST21, the control unit 403 copies (duplicates) the VDP job that is determined to be a test print job. The control unit 304 adds information to attributes of the copied job, indicating that the job is a copy of the test print job. In the following description, the VDP job that is received from the client PC 102 will be referred to as an original job. A job that is copied in step ST21 will be referred to as a copy job.

In step ST22, the printer unit 407 and the post-processing unit 408 perform output processing according to a record of image data and print setting information that are generated by the output job processing unit 406 from the original job. After the output processing, the control unit 403 deletes the original job.

In the print processing of the first record, the control unit 403 caches the reusable data generated by the output job processing unit 406 in a format usable for the copy job. Reusable data is generally deleted after used in a job. The control unit 403 caches the reusable data, for example, as global reusable data so that the reusable data can also be used by the copy job to print the remaining records later.

In step ST23, the control unit 403 updates the job history and adds history information as in step ST04 in FIG. 5. In the present exemplary embodiment, information that indicates correspondence with the copy job is also added as a piece of history information.

In step ST24, the printer unit 407 and the post-processing unit 408 perform output processing according to the image data and the print setting information of the second and subsequent records that are generated by the output job processing unit 406 from the copy job. Such processing is performed based on the information that is added to the attributes of the copy job in step ST21, the information indicating that the job is the copy of the test print job. The output job processing unit 406 generates the image data using the reusable data of the original job, which is cached in step ST22.

In step ST25, the control unit 403 deletes the copy job and the reusable data of the original job, which is cached in step ST22.

The processing procedure in FIG. 6 can provide an advantage of dividing a job into two. For example, the present exemplary embodiment can easily handle interrupt processing for another job when issuance of an instruction to print and output the second to final records takes time.

In the processing procedure in FIG. 6, the present exemplary embodiment may apply a method in which the generated reusable data is not cached in step ST22, and in step ST24, the cached data is not used. In this method, reusing the cached reusable data on a single record can improve the processing speed.

The present exemplary embodiment has described an example where an original job is used for test printing and a copy job is used to print the remaining image data. However, the present exemplary embodiment is not limited to this configuration. The present exemplary embodiment may use a copy job for test printing and use an original job to print the remaining image data.

The above-described exemplary embodiments described examples where the first record of a VDP job is printed as test printing. However, the record to be printed for test printing is not limited to the first record and may be other records. A third exemplary embodiment describes a method for outputting records other than the first record for test printing.

A VDP job includes reusable data to be printed repeatedly. There is the need for a user to check the outcome of reusable data by test printing. An example is to check whether a combination of reusable data, image processing settings, and printing paper type settings is output as intended by the user. In such a case, the user may wish to output all possible pieces of reusable data used in a PPML job.

The printer 103 includes the PDL processing unit 413 which processes PDL data included in a print job. The PDL processing unit 413 identifies reusable data included in a VDP job. For example, in the case of VDP data that includes template data and variable data as described in the first exemplary embodiment, the PDL processing unit 413 can identify the reusable data from the template data. Further, in the case of PPML data, the PDL processing unit 413 can identify the reusable data using a <REUSABLE_OBJECT> tag, that is an XML tag. The PDL processing unit 413 thus identifies reusable data.

When the reusable data is identified, the output job processing unit 406 processes the job from the beginning and performs printing in units of records via the record determination unit 412 so that all possible pieces of the reusable data are output.

More specifically, suppose that a VDP job includes three pieces of reusable data A, B, and C. Suppose also that the first record contains only the reusable data A, the second record contains the reusable data pieces A and B, the third record contains the reusable data pieces A and C, the fourth record contains the reusable data pieces A and B, and so on. In such a case, the output job processing unit 406 processes the job from the beginning and prints the reusable data A by the first record, the reusable data pieces A and B by the second record, and the reusable data pieces A, B, and C by the third record.

The output job processing unit 406 therefore outputs up to the third record for test printing. Alternatively, the output job processing unit 406 can output all the pieces of reusable data A, B, and C by printing only the second and third records without printing the first record. Records may thus be printed in a combination that minimizes the number of records. In such a case, the omitted record(s) is/are printed when the remaining records are printed. When a job needs to be output in order of records, post-processes can be complicated by a merging operation of an output product. In such a case, it is better to print the job from the beginning without omission.

A user may enter the settings from the driver's setting screen 201 illustrated in FIG. 2 as intended. For example, advanced settings for test printing may include options "print only the first record," "print records in order from the first until all reusable data pieces are used," and "print minimum number of records in which all reusable data pieces are used." Further, the user may be allowed to specify arbitrary records to be used for test printing.

Metadata can be used to switch print settings of a VDP job. For example, records for important customers may be printed on an expensive coated paper type sheet, and records for ordinary customers may be printed on a less expensive plain paper type sheet. It is commonly known that different paper types provide different print outputs for the same print data. Then, test printing may be started by printing with a combination for outputting all possible paper types.

As described with the method for outputting all possible pieces of reusable data according to the above-described third exemplary embodiment, the PDL processing unit 413 may examine and output a set of combinations or all possible combinations of metadata.

Similarly to the above description, the user may enter the combinations to output from the driver's setting screen 201 as intended. In this case, the advanced setting for test printing may further include the option "print a record on each paper type".

As described above, a record for the test printing may be determined according to conditions set from the driver's setting screen 201 of the client PC 102. Accordingly, a more effective test print product can be provided to the user.

According to exemplary embodiments of the present invention, it is possible to provide an image forming apparatus which can effectively perform test printing of a VDP job including a plurality of records.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-015400 filed Jan. 27, 2011, which is hereby incorporated by reference herein in its entirety.

What is claimed is:

1. An image forming apparatus for processing a variable data printing (VDP) job including a plurality of records, the image forming apparatus comprising:
a determination unit that determines whether a VDP job received from an information processing apparatus is a test print job of which test printing is instructed,
and that selects, from a first record and a second record included in the VDP job that is determined to be the test print job, in a case where a number of reusable objects included in the second record is greater than a number of reusable objects included in the first record, the second record as a test record of the test printing;
a test print unit that performs test printing of the selected test record;
an accepting unit that accepts a print instruction for a record that is included in the VDP job and is not printed by the test printing after the test record is printed; and
a print unit that prints the record that is included in the VDP job and is not printed by the test printing in response to the print instruction,
wherein the test record to be printed by the test print unit and a target record to be printed by the print unit are different from each other, so that a print product printed by the test print unit includes a print content different from that of a print product printed by the print unit.

2. The image forming apparatus according to claim 1, further comprising a storing unit that stores the record included in the VDP job and is not printed by the test printing after the test record is printed, the test record being stored with image data capable of being printed by the print unit,
wherein the print unit prints, in response to a print instruction accepted by the accepting unit, the image data of the record that is included in the VDP job and is not printed by the test printing, the image data being stored in the storing unit.

3. The image forming apparatus according to claim 2, further comprising a deletion unit that deletes the image data of the record that is included in the VDP job and is not printed by the test printing when the image data is stored in the storing unit for a period equal to or greater than a predetermined period.

4. A method for controlling an image forming apparatus for processing a variable data printing (VDP) job including a plurality of records, the method comprising:
determining whether a VDP job received from an information processing apparatus is a test print job of which test printing is instructed;
selecting from a first record and a second record included in the VDP job determined as the test print job, in a case where a number of reusable objects included in the second record is greater than a number of reusable objects included in the first record, the second record as a test record of the test printing;
performing test printing of the selected test record;
accepting a print instruction for a record that is included in the VDP job and is not printed by the test printing after the test record is printed; and
printing the record that is included in the VDP job and is not printed by the test printing in response to the accepted print instruction,
wherein the test record to be printed by the test printing and a target record to be printed by the printing operation are different from each other, so that a print product printed by the test printing includes a print content different from that of a print product printed by the printing operation.

5. The method according to claim 4, further comprising:
after the test record is printed, storing the record included in the VDP job that was not printed by the test printing, and storing the test record with image data capable of being printed; and responsive to an accepted print instruction, printing the stored image data of the record that is included in the VDP job and is not printed by the test printing.

6. The method according to claim 5, further comprising:
deleting the image data of the record that is included in the VDP job and was not printed by the test printing when the image data is stored for a period equal to or greater than a predetermined period.

7. The non-transitory computer-readable storage medium according to claim 5, further comprising:
when the image data is stored for a period equal to or greater than a predetermined period, deleting the image data of the record that is included in the VDP job and was not printed.

8. The non-transitory computer-readable storage medium according to claim 4, further comprising:
after the test record is printed, storing the record included in the VDP job that was not printed, and storing the test record with image data capable of being printed; and
responsive to an accepted print instruction, printing the stored image data of the record that is included in the VDP job and was not printed.

9. A non-transitory computer-readable storage medium storing a computer-executable program with instructions for causing an image forming apparatus to process a variable data printing (VDP) job including a plurality of records, the program instructions when executed comprising:
determining whether a VDP job received from an information processing apparatus is a test print job of which test printing is instructed;
selecting from a first record and a second record included in the VDP job determined to be the test print job, in a case where a number of reusable objects included in the second record is greater than a number of reusable objects included in the first record, the second record as a test record of the test printing;
performing test printing of a part of the selected test record;
accepting a print instruction for a record that is included in the VDP job and is not printed by the test printing after the test record is printed; and
printing the record that is included in the VDP job and is not printed by the test printing in response to the accepted print instruction,
wherein the test record to be printed by the test printing and a target record to be printed by the printing operation are different from each other, so that a print product printed by the test printing includes a print content different from that of a print product printed by the printing operation.

* * * * *